United States Patent
Malenfant

[19]

[11] Patent Number: 6,091,614
[45] Date of Patent: Jul. 18, 2000

[54] VOLTAGE BOOSTER FOR ENABLING THE POWER FACTOR CONTROLLER OF A LED LAMP UPON LOW AC OR DC SUPPLY

[75] Inventor: Martin Malenfant, Chambly, Canada

[73] Assignee: Ecolux Inc., Lachine, Canada

[21] Appl. No.: 09/017,171

[22] Filed: Feb. 2, 1998

[51] Int. Cl.[7] ........................... H02M 3/335; H05B 37/02
[52] U.S. Cl. ........................................ 363/97; 315/209 R
[58] Field of Search .................................. 363/21, 59, 60, 363/73, 95, 97, 131; 315/127, 209 R, 224, 307, 324

[56] References Cited

U.S. PATENT DOCUMENTS

| | | | |
|---|---|---|---|
| 4,388,578 | 6/1983 | Green et al. | 318/729 |
| 4,634,951 | 1/1987 | Kampf et al. | 318/778 |
| 4,891,569 | 1/1990 | Light | 323/210 |
| 5,394,064 | 2/1995 | Ranganath et al. | 315/209 R |
| 5,412,303 | 5/1995 | Wernicki | 318/729 |
| 5,463,280 | 10/1995 | Johnson | 315/187 |
| 5,581,171 | 12/1996 | Kerfoot et al. | 320/50 |
| 5,583,402 | 12/1996 | Moisin et al. | 315/307 |
| 5,656,923 | 8/1997 | Schultz et al. | 323/207 |
| 5,744,912 | 4/1998 | So | 315/127 |
| 5,886,586 | 3/1999 | Lai et al. | 332/109 |

*Primary Examiner*—Adolf Deneke Berhane
*Attorney, Agent, or Firm*—Goudreau Gage Dubuc & Martineau Walker

[57] ABSTRACT

The light-emitting-diode lamp comprises a set of light-emitting diodes, a rectifier and power converter circuit, and a power factor controller. The rectifier and power converter circuit converts ac or dc voltage and current from a power source to dc voltage and current supplied to the set of light emitting diodes. The rectifier and power converter circuit includes an electronic switch through which it is supplied with ac or dc voltage and current from the power source, and an inductor device including windings adapted to charge a capacitor with a voltage signal representative of the amplitude of the ac or dc voltage from the power source. The power factor controller is responsive to the voltage signal across the capacitor for controlling the electronic switch of the rectifier and power converter circuit in view of supplying dc voltage and current to the set of light emitting diodes while maintaining the power factor of the light-emitting-diode lamp equal to or close to unity. The power factor controller comprises a voltage comparator supplied with the voltage signal across the capacitor for enabling operation of the power factor controller as long as the ac or dc voltage from the power source has an amplitude higher than a first predetermined voltage threshold. A voltage boosting circuit raises the amplitude of the voltage signal across the capacitor when the ac or dc voltage from the power source is lower than the first voltage threshold to keep operation of the power factor controller enabled as long as the ac or dc voltage is higher than a second predetermined voltage threshold lower than the first predetermined voltage threshold.

9 Claims, 1 Drawing Sheet

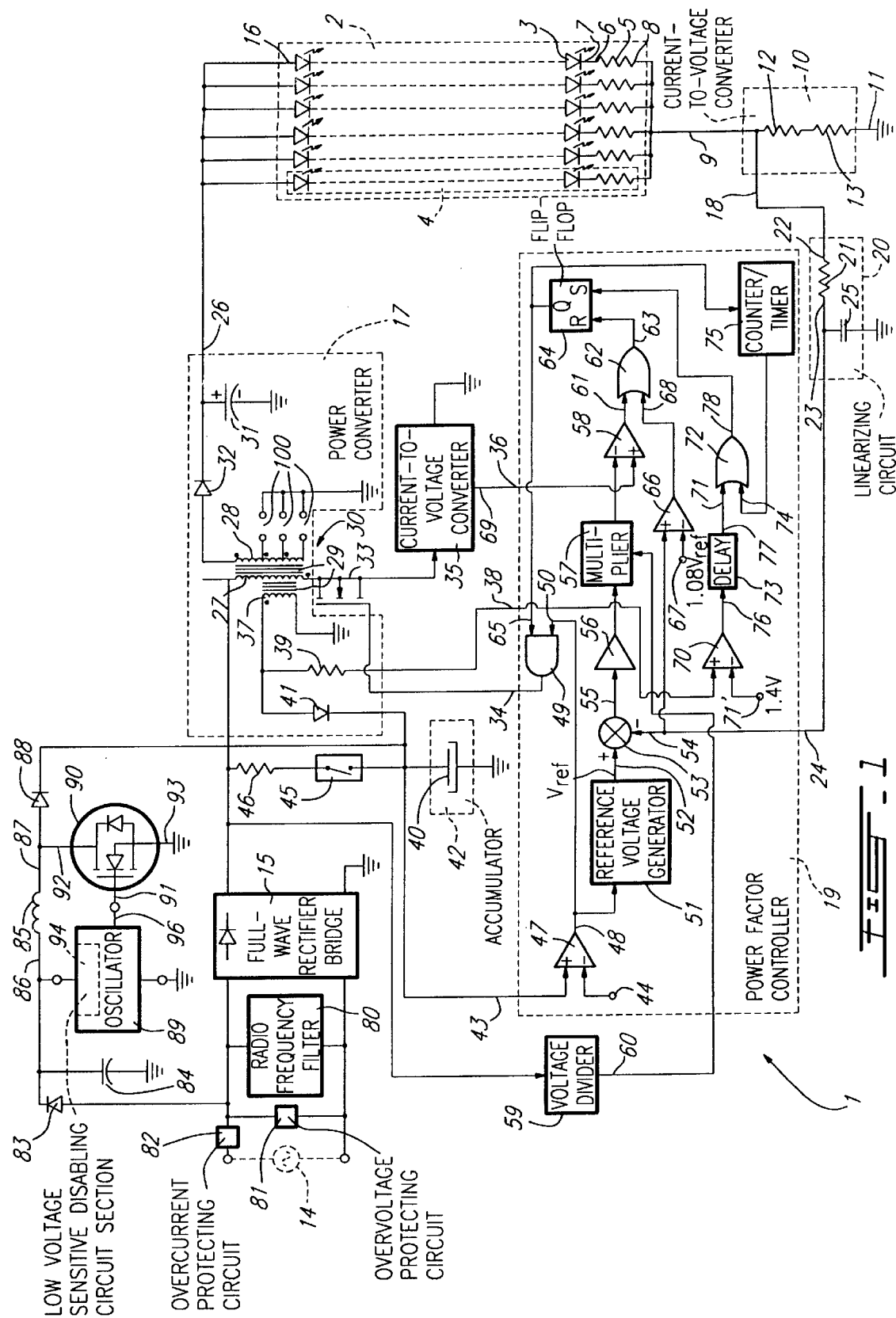

VOLTAGE BOOSTER FOR ENABLING THE POWER FACTOR CONTROLLER OF A LED LAMP UPON LOW AC OR DC SUPPLY

BACKGROUND OF THE INVENTION

1. Field of the Invention

The present invention relates to a voltage boosting circuit for keeping the power factor controller of an electric device enabled when the ac or dc voltage supplying the electric device is lower than a predetermined voltage threshold.

2. Brief Description of the Prior Art

As well known to those of ordinary skill in the art, stand alone systems require loads with low power requirements. For that reason, there presently exists a high demand for light-emitting-diode (LED) lamps for use in traffic lights in hard-to-reach distant regions.

To be used in traffic lights in hard-to-reach distant regions, LED lamps must meet with stringent requirements. For example, in railway signalling, stringent requirements related to power requirement, robustness and power supply flexibility have to be met.

In particular, railway signalling LED lamps must operate at low supply voltage level and accept both alternating and direct currents. Moreover, the power factor must be situated as close as possible to 1 to prevent oversizing of the back-up systems.

OBJECTS OF THE INVENTION

An object of the present invention is therefore to provide a LED lamp comprising a power factor controller and a voltage boosting circuit for supplying the power factor controller with a raised enabling voltage level and thereby keep that power factor controller enabled when the ac or dc voltage supplying the light-emitting- diode lamp is lower than a predetermined voltage threshold.

SUMMARY OF THE INVENTION

More specifically, in accordance with the present invention, there is provided an electric device to be supplied by an electric power source, comprising a dc load, a rectifier and power converter circuit, a voltage signal producing means, a power factor controller, and a voltage boosting circuit. The rectifier and power converter circuit converts ac or dc voltage and current from the power source to dc voltage and current supplied to the dc load, and comprises a switching means through which the rectifier and power converter circuit is supplied with the ac or dc voltage and current from the power source. The voltage signal producing means produces a voltage signal representative of the amplitude of the ac or dc voltage from the power source. The power factor controller controls the switching means of the rectifier and power converter circuit in view of supplying dc voltage and current to the dc load while maintaining the power factor of the electric device equal to or close to unity. Also, the power factor controller comprises a voltage comparator means supplied with the voltage signal representative of the amplitude of the ac or dc voltage from the power source for enabling operation of the power factor controller as long as the ac or dc voltage from the power source has an amplitude higher than a first predetermined voltage threshold. According to the invention, the voltage boosting circuit raises the amplitude of the voltage signal supplied to the voltage comparator means when the ac or dc voltage from the power source is lower than the first predetermined voltage threshold to thereby keep operation of the power factor controller enabled.

In accordance with preferred embodiments of the invention:

the voltage boosting circuit comprises means for enabling the power factor controller as long as the ac or dc voltage from the power source is higher than a second predetermined voltage threshold lower than the first predetermined voltage threshold; and the voltage comparator means has a first input supplied with the voltage signal representative of the amplitude of the ac or dc voltage from the power source, a second input for receiving a reference voltage, and means for enabling the power factor controller when the voltage signal on the first input is higher than the reference voltage on the second input.

In accordance with other preferred embodiments of the present invention:

the voltage boosting circuit is a step-up voltage circuit (boost topology) supplied with the ac or dc voltage from the power source and comprising (a) a first diode comprising a cathode, and an anode supplied with the ac or dc voltage from the power source, (b) a capacitor having a first terminal connected to the cathode of the first diode and a second terminal connected to an electric ground, (c) an inductor having a first terminal connected to the junction between the cathode of the first diode and the first terminal of the capacitor, and a second terminal, (d) a second diode having a cathode, and an anode connected to the second terminal of the inductor, and (e) means for producing a step-up voltage across the capacitor and inductor;

the step-up voltage producing means comprises (a) an electronic switching element having a first electrode connected to the junction between the second terminal of the inductor and the anode of the second diode, a second electrode connected to the electric ground, and a third control electrode, and (b) an oscillator connected between the ground and the junction between the cathode of the first diode, the first terminal of the capacitor and the first terminal of the inductor, the oscillator comprising an output supplying an oscillation signal to the third control electrode for successively turning on and turning off the electronic switching element at a frequency suitable to produce the step-up voltage across the capacitor and inductor;

the oscillator comprises means responsive to a voltage onto the junction between the cathode of the first diode, the first terminal of the capacitor and the first terminal of the inductor, for stopping operation of the oscillator and therefore production of the step-up voltage across the capacitor and inductor when the amplitude of the ac or dc voltage from the power source is lower than a second predetermined voltage threshold lower than the first predetermined voltage threshold, whereby the amplitude of the voltage signal is no longer raised by the voltage boosting circuit and the power factor controller is disabled; and the means for producing a voltage signal representative of the amplitude of the ac or dc voltage from the power source comprises an inductor device of the rectifier and power converter circuit, the inductor device comprising (a) a magnetic core, (b) a first winding mounted on the magnetic core and supplied with voltage and current from the power source, (c) a second winding mounted on the magnetic core and in which voltage and current are induced by the voltage and current supplied by the power source to the first winding, and (d) a capacitor charged by the voltage and current induced in the second winding for producing the voltage signal.

The present invention also relates to a light-emitting-diode lamp to be supplied by an electric power source and comprising a set of light emitting diodes, a rectifier and power converter circuit, a voltage signal producing means, a power factor controller, and a voltage boosting circuit. The rectifier and power converter circuit converts ac or dc voltage and current from the power source to do voltage and current supplied to the set of light emitting diodes, and comprises a switching means through which the rectifier and power converter circuit is supplied with the ac or do voltage and current from the power source. The voltage signal producing means produces a voltage signal representative of the amplitude of the ac or dc voltage from the power source, and the power factor controller controls the switching means of the rectifier and power converter circuit in view of supplying dc voltage and current to the set of light emitting diodes while maintaining the power factor of the light-emitting-diode lamp equal to or close to unity. The power factor controller comprises a voltage comparator means supplied with the voltage signal representative of the amplitude of the ac or dc voltage from the power source for enabling operation of the power factor controller as long as the ac or dc voltage from the power source has an amplitude higher than a first predetermined voltage threshold. Again, the voltage boosting circuit raises the amplitude of the voltage signal supplied to the voltage comparator means when the ac or dc voltage from the power source is lower than the first predetermined threshold to thereby keep operation of the power factor controller enabled.

The objects, advantages and other features of the present invention will become more apparent upon reading of the following non restrictive description of a preferred embodiment thereof, given by way of example only with reference to the accompanying drawings.

BRIEF DESCRIPTION OF THE DRAWINGS

In the appended drawings:

FIG. 1 is a schematic circuit of a preferred embodiment of LED lamp according to the invention, comprising a power factor controller and a voltage boosting circuit.

DETAILED DESCRIPTION OF THE PREFERRED EMBODIMENT

Although the preferred embodiment of the invention will be described hereinafter with reference to an application to a power-factor-controlled LED lamp, it should be kept in mind that the present invention can also be applied to other types of power-factor-controlled electric loads.

Referring to appended FIG. 1, the LED lamp is generally identified by the reference 1. It comprises a set 2 of light-emitting diodes such as 3. The set 2 is formed of a plurality of subsets such as 4 of serially interconnected light-emitting diodes 3. The subsets 4 of serially interconnected light-emitting diodes 3 are connected in parallel to each other to form the set 2.

A resistor 5 has a first terminal 6 connected to the cathode 7 of the last light-emitting diode 3 of each subset 4, and a second terminal 8 connected to a first terminal 9 of a current-to-voltage converter 10. The current-to-voltage converter 10 has a second terminal 11 connected to the ground. As illustrated in FIG. 1, the current-to-voltage converter 10 is formed of two serially interconnected resistors 12 and 13 which produce a voltage signal having an amplitude proportional to the intensity of current flowing through these resistors 12 and 13. Of course, the serial resistors 12 and 13 can be replaced by a single resistor of suitable resistance value.

The set 2 of light-emitting diodes 3 can be supplied either by an ac (alternating current) or dc (direct current) source 14 through conventional overcurrent protecting circuit 82, overvoltage protecting circuit 81 and radio frequency filter 80. Ac voltage and current from the source 14 are rectified by a full-wave rectifier bridge 15 and supplied to the anode 16 of the first diode 3 of each subset 4 through a power converter 17. In the same manner, dc voltage and current from the source 14 are transmitted to the anode 16 of the first diode 3 of each subset 4 through the full-wave rectifier bridge 15 and the power converter 17. A switching device (not shown) can be provided to selectively connect the ac or dc power source 14 to the light-emitting-diode lamp 1 in order to control supply of the light-emitting diodes 3.

Therefore, the dc current flowing through each subset 4 of light-emitting diodes 3 has an amplitude limited by the resistor 5. Also, the dc current flowing through all the subsets 4 of light-emitting diodes 3 flow through the serial resistors 12 and 13 of the current-to-voltage converter 10 to convert the total current flowing through the set 2 of light-emitting diodes 3 into a corresponding current-representative dc voltage signal delivered onto an output 18 of the converter 10.

To allow a power factor controller 19 to perform a current feedback control of the supply of the set 2 of light-emitting diodes 3, a linearizing circuit 20 is required. The controller 19 is, in the illustrated example, the power factor controller manufactured and commercialized by the company Motorola and identified by the reference MC34262. This controller 19 is not capable of conducting a direct current feedback control of non linear loads such as light-emitting diodes.

Since the characteristics and properties of light-emitting diodes 3 (load) are very well known and documented, it is possible to design a low cost and very simple linearizing circuit 20 consisting of a filter circuit formed of:

- a resistor 21 having a first terminal 22 connected to the output 18 of the current-to-voltage converter 10, and a second terminal 23 connected to an input 24 of the power factor controller 19; and
- a capacitor 25 connected between terminal 23 of the resistor 21 and the ground.

The function of the linearizing circuit 20 is to transform the non linear relation between the LED supply dc voltage at the output 26 of the power converter 17 and the dc current supplied to the set 2 of light-emitting diodes 3 into a linear relation. For this purpose, the values of the resistor 21 and capacitor 25 must be precisely and carefully adjusted in relation to the current-to-voltage converting characteristic of the converter 10 and the voltage/current characteristic of the type of diode 3 being used.

By means of a simple filter circuit (linearizing circuit 20) integrated into the current feedback loop, the non linear load (light-emitting diodes 3) is sensed by the power factor controller 19 as a linear load. More specifically, the input voltage feedback signal on the input 24 of the power factor controller 19 varies linearly with the LED supply dc voltage at the output 26 of the power converter 17. To current feedback control the supply of the set 2 of light-emitting diodes 3, the power factor controller 19 requires on its input 24 a current-representative voltage feedback signal which varies linearly with the LED supply dc voltage at the output 26 of the power converter 17.

Still referring to FIG. 1, the power converter 17 comprises an inductor device 30 having a magnetic core 29 and a coil 27 wound on the magnetic core 29 and supplied with the full-wave rectified or dc voltage and current from the rectifier bridge 15. A second multi-tap coil 28 is wound on the magnetic core 29 of the inductor device 30. The coils 27 and 28 act as primary and secondary windings, respectively, of a transformer to transmit a rectified or dc voltage and current to a capacitor 31 through a diode 32. Electric energy is stored in the capacitor 31 to convert the full-wave rectified voltage from the coil 28 to a dc voltage supplied to the output 26 of the converter and therefore to the set 2 of light-emitting diodes 3; alternatively dc power from the coil 28 is stored in capacitor 31 in view of supplying the set 2 of light emitting diodes. The diode 32 prevents return of the electrical energy stored in the capacitor 31 toward the coil 28. The level of dc voltage across the capacitor 31 and therefore the level of the LED supply dc voltage on the output 26 can be adjusted by selecting the appropriate tap of coil 28.

Supply of coil 27 of the inductor device 30 is controlled by an output 34 of the power factor controller 19 through a MOSFET power transistor 33. The current supplying the coil 27 is converted to a voltage signal by a current-to-voltage converter 35 connected between transistor 33 and the ground. The current-to-voltage converter 35 supplies an input 36 of the power factor controller 19 with the voltage signal.

The current through the coil 27 is also measured by means of an additional coil 37 wound onto the magnetic core 29 of the inductor 30. The current-representative voltage appearing across the additional coil 37 is supplied to an input 38 of the power factor controller 19 through a resistor 39.

The current-representative voltage appearing across the additional coil 37 is also supplied to an accumulator 42, formed by a capacitor 40, through a diode 41. The function of the accumulator 42 is to supply an input 43 of the controller 19 with a dc voltage amplitude higher than a minimum voltage reference 44 to enable operation of the power factor controller 19. The capacitor 40 can also be charged by the full-wave rectified or dc voltage and current at the output of the rectifier bridge 15 through serially interconnected switching device 45 and resistor 46.

The power factor controller 19 comprises a comparator 47 having a non inverting input supplied with the voltage across the capacitor 40, an inverting input supplied with a minimum voltage reference 44 required to operate the power factor controller 19, and an output 48 connected to an input 50 of an "AND" gate 49.

The power factor controller 19 further comprises a reference voltage generator 51 having an input connected to the output 48 of the comparator 47 and an output connected to a positive input 52 of a subtractor 53. Subtractor 53 also comprises a negative input 54 connected to the input 24 of the power factor controller 19. Subtractor 53 therefore subtracts the reference voltage $V_{ref}$ on the input 52 from the input voltage feedback signal on the input 54, and supplies on its output 55 a corresponding subtraction signal. The subtraction signal from the output 55 is amplified by an amplifier 56 and the amplified signal is multiplied by a multiplier 57 and the multiplied signal supplied to the inverting input of a comparator 58. A voltage divider 59 is responsive to the full-wave rectified or dc voltage at the output of the rectifier bridge 15 to supply on its output 60 a reference control voltage supplied to the multiplier 57 to control the multiplying factor of this multiplier. The non inverting input of the comparator 58 is connected to the output 69 of the current-to-voltage converter 35.

The signal at the output of the comparator 58 is supplied to an input 61 of an "OR" gate 62 having an output 63 connected to the "Reset" input of a R–S flip-flop 64. The output Q of flip-flop 64 is connected to an input 65 of the "AND" gate 49.

The voltage feedback signal on the input 24 is also supplied to the non inverting input of a comparator 66, this comparator having an inverting input supplied with a reference voltage 67 equal to 1.08 $V_{ref}$, $V_{ref}$ being the reference voltage produced by the generator 51. The output of the comparator 66 is connected to an input 68 of the "OR" gate 62.

The power factor controller 19 further comprises a comparator 70 having an inverting input supplied with a 1.4 volt reference voltage 71. The non inverting input of the comparator 70 is supplied with the voltage across the coil 37 through the resistor 39. Comparator 70 has an output connected to an input 71 of an "OR" gate 72 through a delay circuit 73. The "OR" gate 72 has a second input 74 connected to the output Q of the flip-flop 64 through a counter/timer 75, and an output 78 connected to the "Set" input of the R-S flip-flop 64.

Upon turning the LED lamp 1 off, the voltage across the coil 37 raises sufficiently to apply to the non inverting input of the comparator 70 a voltage higher than the 1.4 volt reference voltage applied to the inverting input of this comparator 70. Comparator 70 then produces on its output a high logic level signal supplied to the input 76 of the delay circuit 73. When the voltage across the coil 37 subsequently falls, the signal on the output of the comparator 70 passes from a high logic level to a low logic level to cause a high logic level to appear on the output 77 of the delay circuit 73. This high logic level on the output 77 is stored by the delay circuit 73.

When the LED lamp 1 is subsequently turned on, the high logic level signal stored by the delay circuit 73 is supplied to the input 71 of the "OR" gate 72 which then produces a high logic level on its output 78. The high logic level signal on the output 78 of the "OR" gate 72 is supplied to the "Set" input of the flip-flop 64.

Upon turning the LED lamp 1 on, the capacitor 40 is discharged. In response to the full-wave rectified or dc voltage which then appears at the output of the rectifier bridge 15, the switching device 45 closes to allow the full-wave rectified or dc voltage from the rectifier bridge 15 to charge the capacitor 40 through the resistor 46. When the voltage across the capacitor 40 oversteps the minimum voltage reference 44 required to operate the controller 19, the comparator 47 generates on its output 48 a high logic level signal supplied both to the input 50 of the "AND" gate 49, and to the input of the reference voltage generator 51.

In response to the high logic level signal from the comparator 47, the reference voltage generator 51 produces the reference voltage $V_{ref}$ supplied to the positive input 52 of the subtractor 53. Subtractor 53 also comprises a negative input 54 supplied by the voltage feedback signal from the input 24. At this moment, the MOSFET transistor 33 is in a non conducting state and no current flows through the set 2 of light-emitting diodes 3, whereby the input voltage feedback signal produced by the linearizing circuit 20 has an amplitude substantially equal to zero. Subtractor 53 therefore subtracts from the reference voltage $V_{ref}$ on the input 52 the voltage feedback signal on the input 54, and supplies on its output 55 a subtraction signal. The subtraction signal from the output 55 is amplified by the amplifier 56, the amplified signal is multiplied by the multiplier 57, and the multiplied signal is supplied to the inverting input of a comparator 58. At that time, the voltage signal at the output of the current-to-voltage converter 35 is also substantially equal to zero whereby the comparator 58 supplies a low logic level signal to the input 61 of the "OR" gate 62.

The voltage feedback signal on the input 24 is also supplied to the non inverting input of the comparator 66. As the amplitude of this voltage feedback signal is substantially equal to zero and the inverting input of the comparator 66 is supplied with the reference voltage 67 equal to 1.08 $V_{ref}$, this comparator 66 supplies to the input 68 of the "OR" gate 62 a low logic level signal.

As both the inputs 61 and 68 are supplied with a low logic level signal, the "OR" gate 62 supplies a low logic level signal to the "Reset" input of the flip flop 64. Since a high logic level signal is supplied to the "Set" input of the flip-flop 64, a high logic level signal is produced by the input Q of the flip-flop 64 and supplied to the input 65 of the "AND" gate 49. The "AND" gate 49 then supplies a high logic level signal on the output 34 of the controller 19 to turn the MOSFET transistor 33 on.

In response to the high logic level signal on the output Q of the flip-flop 64, the counter/timer 75 supplies the input 74 of the "OR" gate 72 with a high logic level signal during a predetermined period of time whereby the "OR" gate 72 supplies a high logic level signal to the "Set" input of the flip-flop 64 during this period of time. Accordingly, the MOSFET transistor 33 remains conductive during that period of time provided that no high logic level signal is supplied to the "Reset" input of the flip-flop 64.

Conduction of the MOSFET transistor 33 causes a current to flow through the converter 35 which then produces on its output 69 a voltage signal applied to the non inverting input of the comparator 58. Conduction of the MOSFET transistor 33 also causes supply of the set 2 of light-emitting diodes 3 as described in the foregoing description, and the linearizing circuit 20 to produce an input voltage feedback signal supplied to the non inverting input of the comparator 66.

As long as the two following conditions are met, no high logic level signal will be supplied to the "Reset" input of the flip-flop 64:

Condition 1: the voltage signal on the output 69 of the current-to-voltage converter 35 and supplied to the non inverting input of the comparator 58 is lower than the multiplied signal supplied by the multiplier 57 to the inverting input of the comparator 68, indicating that the current through the set 2 of light-emitting diodes has not reached an unacceptable level; and Condition 2: the amplitude of the voltage feedback signal produced by the linearizing circuit 20 and supplied to the input 24 of the controller 19 and to the non inverting input of the comparator 66 is lower than reference voltage 67 equal to 1.08 $V_{ref}$ and supplied to the inverting input of the comparator 66, indicating that no overcurrent situation exists.

Regarding condition 1, it should be mentioned that since the reference control voltage is supplied to the multiplier 57 by the voltage divider 59 in response to the full-wave rectified or dc voltage from the rectifier bridge 15, the amplitude of this reference control voltage and therefore the multiplying factor of the multiplier varies with the amplitude of the full-wave rectified or dc voltage to vary accordingly the signal supplied to the inverting input of the comparator 58 and make valid the comparison test conducted by the comparator 58.

It should also be understood that every time the voltage signal from the current-to-voltage converter 35 and supplied to the non inverting input of the comparator 58 oversteps the amplitude of the signal from the multiplier 57 and supplied to the inverting input of the comparator 58, the latter comparator 58 transmits a high logic level signal to the "Reset" input of the flip-flop 64 through the "OR" gate 62. The output Q of the flip-flop 64 then passes from a high logic level to a low logic level to turn the MOSFET transistor 33 off through the "AND" gate 49, to thereby prevent that the dc current through the set 2 of light-emitting diodes reaches an unacceptable level.

At the end of the predetermined period of time, the counter/timer 75 supplies a low logic level signal on the input 74 of the "OR" gate 72. Upon turning the MOSFET transistor 33 on, the amplitude of the voltage across the coil 37 has increased to cause (a) the voltage on the non inverting input of the comparator 70 to pass from a value lower to a value higher than the 1.4 volt reference voltage applied to the inverting input of the same comparator 70 and (b) a transition of the output of the comparator 70 from a low to a high logic level to thereby produce a low logic level signal on both the output 77 of the delay circuit 73 and the input 71 of the "OR" gate 72. As a low logic level signal appears on both inputs 71 and 74 of the "OR" gate 72, a low logic level signal also appears on the output 78 of the latter gate, which low logic level signal is supplied to the "Set" input of the flip-flop 64.

At the end of the predetermined period of time determined by the counter/timer 75, the voltage signal from the current-to-voltage converter 35 and supplied to the non inverting input of the comparator 58 will normally overstep the amplitude of the signal from the multiplier 57 and supplied to the inverting input of the comparator 58 to enable this comparator 58 to transmit a high logic level signal to the "Reset" input of the flip-flop 64 through the "OR" gate 62. The output Q of the flip-flop 64 then passes from a high logic level to a low logic level to turn the MOSFET transistor 33 off through the "AND" gate 49.

Turning the MOSFET transistor 33 off causes a reduction of the voltage across the coil 37. Then, the voltage on the non inverting input of the comparator 70 passes to an amplitude higher to an amplitude lower than the 1.4 volt reference voltage applied to the inverting input of the same comparator. The comparator 70 thereby detects zero-crossing of the current through the coil 27 and, upon this detection, the output of the comparator to passes from a high to a low logic level to produce on the output 77 of the delay circuit a high logic level transmitted to the "Set" input of the flip-flop 64. In the meantime, the "Reset" input of the flip-flop 64 has returned to a low logic level and the above described conduction cycle of the MOSFET transistor 33 is repeated until the LED lamp 1 is turned off.

Those of ordinary skill in the art will appreciate that the current flowing though the MOSFET transistor 33 follows the full-wave rectified voltage (if the source 14 is an ac source) at the output of the rectifier bridge 15. The power factor is therefore if not equal to 1, close to unity. To further smoothen the current waveform and withdraw the MOSFET switching high frequencies therefrom, the radio frequency filter 80 is introduced between the source 14 and the full-wave rectifier bridge 15.

Upon reduction of the amplitude of the ac or dc voltage from the power source 14, the amplitude of the voltage across the capacitor 40 may no longer be sufficient to sustain operation of the power factor controller 19 and, therefore, operation of the LED lamp 1. Indeed, the power factor controller 19 will not permit command of the MOSFET power transistor 33 in the presence of a low supply voltage to prevent any improper power switching and heating of that MOSFET power transistor; this will also prevent low efficiency of the power factor converter 17 due to improper switching of the MOSFET power transistor 33. This is an obvious drawback when the operation of the LED lamp 1 at lower supply voltage level is required, for example in an application of the LED lamp 1 to railway signalling in hard-to-reach distant regions. It is reminded that in such application, LED lamps must operate at low supply voltage ac or dc levels, accept both alternating and direct currents, and operate at a power factor situated as close as possible to 1.

To overcome this drawback, a voltage boosting circuit, more specifically a mini-booster is provided. Referring to FIG. 1, this mini-booster comprises:

a diode 83 having an anode connected between the overvoltage protecting circuit 81 and the radio frequency filter 80, and a cathode;

a capacitor 84 having a positive terminal connected to the cathode of the diode 83;

an inductor 85 having a first terminal 86 connected to the junction between the cathode of the diode 83 and to the positive terminal of the capacitor 84, and a second terminal 87;

a diode 88 having an anode connected to the terminal 87 of the inductor 85 and a cathode connected to the positive terminal of the capacitor 40;

an oscillator 89 inserted between (a) the junction between the cathode of the diode 83, the positive terminal of the capacitor 84, and terminal 86 of the inductor 86, and (b) the ground; and a semiconductor switching element, more specifically a MOSFET transistor 90 having a source electrode 92 connected to the junction between terminal 87 of the inductor 85 and the anode of the diode 88, a drain electrode 93 connected to the ground, and a gate electrode 91 connected to an output 94 of the oscillator 89.

In operation, the ac voltage from the power source 14 is half-wave rectified by the diode 83 or the dc voltage from the same source is supplied through diode 83. The oscillator 89 successively turns on and turns off the MOSFET transistor 90 at a frequency selected to produce, in response to the half-wave rectified or dc voltage from the diode 83, a step-up voltage across the capacitor 84 and inductor 85. This step-up voltage is half-wave rectified and supplied to the capacitor 40 through the diode 88. Those of ordinary skill in the art will appreciate that the boost topology of the voltage boosting circuit produces an alternating voltage of higher amplitude to increase accordingly the dc voltage across the capacitor 40. Therefore, upon reduction of the amplitude of the ac or dc voltage from the power source 14, the voltage boosting circuit will increase the amplitude of the dc voltage across the capacitor 40 to a level higher than the voltage reference 44 to thereby sustain and enable operation of the power factor controller 19.

However, it should be kept in mind that operation of the power factor controller 19 must not be permitted when the voltage from the power source 14 is lower than a predetermined safety voltage level. For that purpose, the oscillator 89 includes a low voltage sensitive disabling circuit 94 responsive to the half-wave rectified or dc voltage from the diode 83 to stop the operation of the oscillator 89 when this half-wave rectified or dc voltage is lower than the above mentioned predetermined safety voltage level, whereby the amplitude of the dc voltage across the capacitor 40 is no longer raised by the voltage boosting circuit and the power factor controller 19 is disabled.

Although the present invention has been described hereinabove by way of a preferred embodiment thereof, this embodiment can be modified at will, within the scope of the appended claims, without departing from the spirit and nature of the subject invention.

What is claimed is:

1. An electric device to be supplied by an electric power source, comprising:

a dc load;

a rectifier and power converter circuit for converting ac or dc voltage and current from the power source to dc voltage and current supplied to the dc load, the rectifier and power converter circuit comprising a switching means through which said rectifier and power converter circuit is supplied with the ac or dc voltage and current from the power source;

means for producing a voltage signal representative of the amplitude of the ac or dc voltage from the power source;

a power factor controller for controlling the switching means of the rectifier and power converter circuit in view of supplying dc voltage and current to the dc load while maintaining the power factor of the electric device equal to or close to unity, the power factor controller comprising a voltage comparator means supplied with the voltage signal representative of the amplitude of the ac or dc voltage from the power source for enabling operation of the power factor controller as long as the ac or dc voltage from the power source has an amplitude higher than a first predetermined voltage threshold; and a voltage boosting circuit for raising the amplitude of the voltage signal supplied to the voltage comparator means when the ac or do voltage from the power source is lower than the first predetermined voltage threshold to thereby keep operation of the power factor controller enabled.

2. The electric device of claim 1, wherein the voltage boosting circuit comprises means for enabling the power factor controller as long as the ac or dc voltage from the power source is higher than a second predetermined voltage threshold lower than the first predetermined voltage threshold.

3. The electric device of claim 2, wherein the voltage comparator means has a first input supplied with the voltage signal representative of the amplitude of the ac or dc voltage from the power source, a second input for receiving a reference voltage, and means for enabling the power factor controller when the voltage signal on the first input is higher than the reference voltage on the second input.

4. The electric device of claim 1, wherein the voltage boosting circuit comprises:

a first diode comprising a cathode, and an anode supplied with the ac or dc voltage from the power source;

a capacitor having a first terminal connected to the cathode of the first diode and a second terminal connected to an electric ground;

an inductor having a first terminal connected to the junction between the cathode of the first diode and the first terminal of the capacitor, and a second terminal;

a second diode having a cathode, and an anode connected to the second terminal of the inductor; and means for producing a step-up voltage across the capacitor and inductor.

5. The electric device of claim 4, wherein the step-up voltage producing means comprises:

an electronic switching element having a first electrode connected to the junction between the second terminal of the inductor and the anode of the second diode, a second electrode connected to the electric ground, and a third control electrode; and an oscillator connected between (a) the junction between the cathode of the first diode, the first terminal of the capacitor and the first terminal of the inductor and (b) the electric ground, said oscillator comprising an output supplying an oscillation signal to the third control electrode for successively turning on and turning off the electronic switching element at a frequency suitable to produce the step-up voltage across the capacitor and inductor.

6. The electric device of claim 5, wherein the oscillator comprises means responsive to a voltage onto the junction between the cathode of the first diode, the first terminal of the capacitor and the first terminal of the inductor, for stopping operation of said oscillator and therefore production of the step-up voltage across the capacitor and inductor when the amplitude of the ac or dc voltage from the power source is lower than a second predetermined voltage threshold lower than the first predetermined voltage threshold, whereby the amplitude of the voltage signal is no longer raised by the voltage boosting circuit and the power factor controller is disabled.

7. The electric device of claim 1, wherein the means for producing a voltage signal representative of the amplitude of the ac or dc voltage from the power source comprises an inductor device of the rectifier and power converter circuit, said inductor device comprising:

a magnetic core;

a first winding mounted on the magnetic core and supplied with voltage and current from the power source;

a second winding mounted on the magnetic core and in which voltage and current are induced by the voltage and current supplied by the power source to the first winding; and a capacitor charged by the voltage and current induced in the second winding for producing the voltage signal.

8. The electric device of claim 4, wherein the means for producing a voltage signal representative of the amplitude of the ac or dc voltage from the power source comprises an inductor device of the rectifier and power converter circuit, said inductor device comprising:

a magnetic core;

a first winding mounted on the magnetic core and supplied with voltage and current from the power source;

a second winding mounted on the magnetic core and in which voltage and current are induced by the voltage and current supplied by the power source to the first winding; and a capacitor charged by the voltage and current induced in the second winding for producing the voltage signal, and having a first grounded terminal and a second terminal connected to the cathode of the second diode.

9. A light-emitting-diode lamp to be supplied by an electric power source, comprising:

a set of light emitting diodes;

a rectifier and power converter circuit for converting ac or dc voltage and current from the power source to dc voltage and current supplied to the set of light emitting diodes, the rectifier and power converter circuit comprising a switching means through which said rectifier and power converter circuit is supplied with the ac or do voltage and current from the power source;

means for producing a voltage signal representative of the amplitude of the ac or dc voltage from the power source;

a power factor controller for controlling the switching means of the rectifier and power converter circuit in view of supplying do voltage and current to the set of light emitting diodes while maintaining the power factor of the light-emitting-diode lamp equal to or close to unity, the power factor controller comprising a voltage comparator means supplied with the voltage signal representative of the amplitude of the ac or dc voltage from the power source for enabling operation of the power factor controller as long as the ac or do voltage from the power source has an amplitude higher than a first predetermined voltage threshold; and a voltage boosting circuit for raising the amplitude of the voltage signal supplied to the voltage comparator means when the ac or dc voltage from the power source is lower than the first predetermined threshold to thereby keep operation of the power factor controller enabled.

* * * * *

UNITED STATES PATENT AND TRADEMARK OFFICE
CERTIFICATE OF CORRECTION

PATENT NO. : 6,091,614
DATED : JULY 18, 2000
INVENTOR(S) : Martin MALENFANT

It is certified that error appears in the above-identified patent and that said Letters Patent are hereby corrected as shown below:

On the cover page of the patent, under item "<22> Filed: Feb. 2, 1998", please insert item " <30> Foreign Application Priority Data" to include the data -- Dec. 17, 1997 (CA) Canada 2,225,004--

Signed and Sealed this

Seventeenth Day of April, 2001

Attest:

NICHOLAS P. GODICI

*Attesting Officer*     *Acting Director of the United States Patent and Trademark Office*